United States Patent [19]

Earl

[11] Patent Number: 5,292,013
[45] Date of Patent: Mar. 8, 1994

[54] SUPPORT FERRULES

[75] Inventor: Tommy L. Earl, Greenville, Tex.

[73] Assignee: E-Systems, Inc., Dallas, Tex.

[21] Appl. No.: 966,530

[22] Filed: Oct. 23, 1992

[51] Int. Cl.$^5$ .............................................. F16L 3/00
[52] U.S. Cl. ........................................ 248/73; 248/65; 248/224.2
[58] Field of Search ..................... 248/49, 51, 52, 58, 248/60, 73, 74.4, 225.1, 223.4, 224.1, 224.2, 205.3, 206.5

[56] References Cited

U.S. PATENT DOCUMENTS

| | | |
|---|---|---|
| 1,475,722 | 11/1923 | Romandy . |
| 2,840,629 | 6/1958 | Roth et al. ...................... 248/73 X |
| 2,945,081 | 7/1960 | Bogese et al. .................. 248/73 X |
| 2,969,216 | 1/1961 | Hallsey . |
| 3,527,432 | 9/1970 | Lytle . |
| 3,807,675 | 4/1974 | Seckerson et al. .................. 248/73 |
| 3,884,438 | 5/1975 | Logsdon . |
| 3,894,706 | 7/1975 | Mizusawa ...................... 248/73 X |
| 4,090,796 | 5/1978 | Okuda et al. . |
| 4,481,269 | 11/1984 | Barrett, Jr. . |
| 4,516,296 | 5/1985 | Sherman . |
| 4,555,083 | 11/1985 | Carter . |
| 5,040,753 | 8/1991 | Roth . |
| 5,042,615 | 8/1991 | Anderson . |
| 5,097,798 | 3/1992 | Little ........................... 248/58 X |

FOREIGN PATENT DOCUMENTS 629040 9/1949 United Kingdom ........... 248-224.2

Primary Examiner—Robert W. Gibson, Jr.
Attorney, Agent, or Firm—Harold E. Meier

[57] ABSTRACT

A ferrule for supporting a wiring harness or a piping part on a host structure includes a base member mounted to the host structure, and a support member engaging the base member. The support member includes an aperture for receiving the wiring harness or piping part. The support member may include a dovetail- or T-shaped protuberance, and the base member may include a corresponding dovetail or T-shaped slot for receiving the protuberance for detachably mounting the support member to the base member.

4 Claims, 3 Drawing Sheets

SUPPORT FERRULES

TECHNICAL FIELD

This invention relates to structural supports for aircraft, and more particularly to ferrules for supporting wiring harnesses and flexible piping parts in aircraft.

BACKGROUND OF THE INVENTION

When wiring harnesses or flexible piping parts are installed in aircraft, such parts are usually provided with some type of structural support. Heretofore, cushion clamps have been the conventional method of providing structural support for wiring harnesses and flexible piping parts used in aircraft fuel tanks, etc. exposed to chemicals or extreme cold.

Using the cushion clamp of prior art techniques, a wiring harness or piping part is snugly clamped to the fuel tank or other host structure. Considerable time and effort is involved in the installation and removal of the part. Moreover, after the part is installed, considerable time and effort is required for routine maintenance or alteration because the cushion clamps must be removed via small access holes to reach the part needing maintenance or modification. The additional time and effort required to install, maintain, or remove the part adds significant costs to the project.

SUMMARY OF THE INVENTION

The present invention comprises a support ferrule for supporting a wiring harness or piping part on a host structure which overcomes the foregoing disadvantages associated with the prior art.

A support ferrule according to one embodiment includes a base member mounted to the host structure and a support member integrally formed along the longitudinal axis of the base member. The support member includes an aperture for receiving a wiring harness or piping part.

DESCRIPTION OF THE DRAWINGS

For a more complete understanding of the present invention and the advantages thereof, reference is now made to the following Detailed Description taken in conjunction with the accompanying Drawings in which.

DETAILED DESCRIPTION

Figure 1:
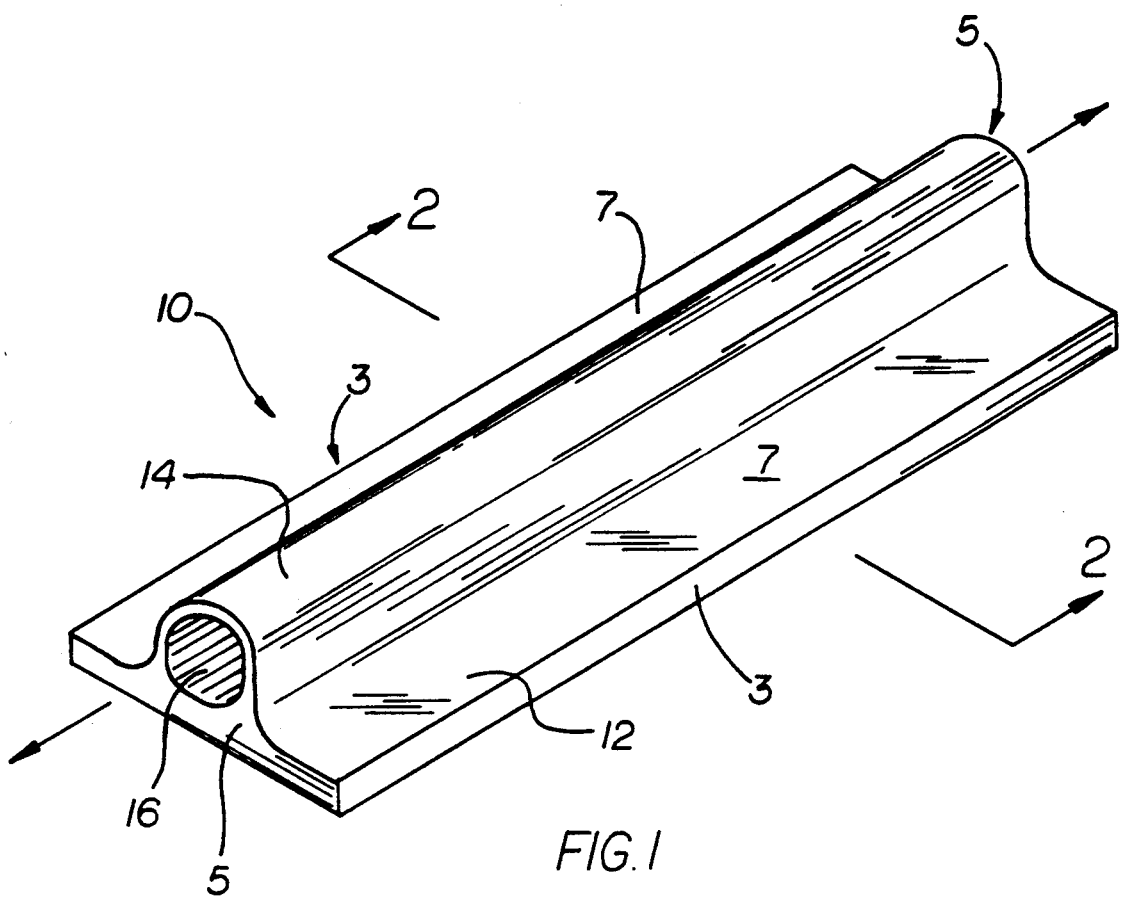
FIG. 1 is a perspective view of a first embodiment of a support ferrule according to the present invention.

Referring now to the Drawings, wherein like reference characters designate like or similar parts throughout the eight views, FIG. 1 is a perspective view of a first embodiment of a support ferrule 10 according to the present invention. Various embodiments of the support ferrule of the present invention include fixed or detachable ferrules. The support ferrule illustrated in FIG. 1 is designed to be fixed to a host structure, such as the fuel tank of an aircraft.

Figure 2:
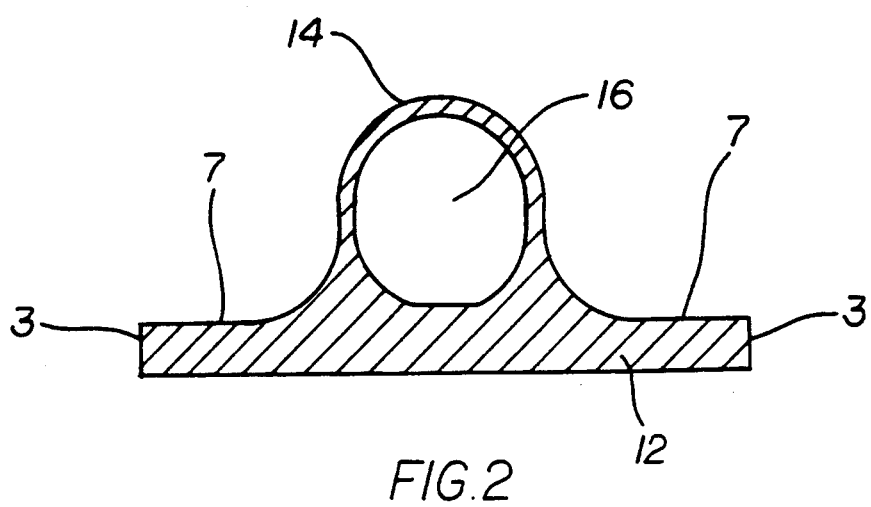
FIG. 2 is a cross-sectional view along line 2—2 of the support ferrule illustrated in FIG. 1.

Referring to FIGS. 1 and 2, a base member 12, having a substantially rectangular configuration, including a pair of outwardly extending, substantially parallel support legs 7 defined by parallel elongate sides 3 and transverse ends 5 is mounted by fastening means (not shown) to a host structure (not shown). Preferably, the base member 12 is inlay bonded to the surface of the host structure, however, other fastening means known in the art may also be used. In its use, the base member 12 may be secured to a wiring harness or piping part at the time of its manufacture, and then subsequently mounted to the host structure during installation.

The base member 12 is manufactured of a material, such as a metal, capable of providing a predetermined amount of support to the wiring harness or piping part.

A support member 14 is integrally formed to the base member 12 to form a unitary one piece structure. Usually, the support member 14 will be manufactured of the same or similar material as the base member 12. As shown, the support member 14 is substantially cylindrical, insert from the support legs 7 and is disposed along the longitudinal axis of the base member 12, and includes an enclosed tubular aperture 16 that extends continuously along the length of the support member, terminating at transverse ends 5.

During installation, a wiring harness or piping part is threaded through the aperture 16. The access to the wiring or piping part provided by the aperture 16 permits maintenance or alteration of the wiring or piping part without removal of the support ferrule.

Similarly, when the wiring or piping part is no longer required, the part is removed quickly and easily by means of the aperture 16. If additional wiring or piping parts are required for alteration of the system, the new part is threaded through the anchored support ferrule, leaving the existing part in place.

Figure 3:
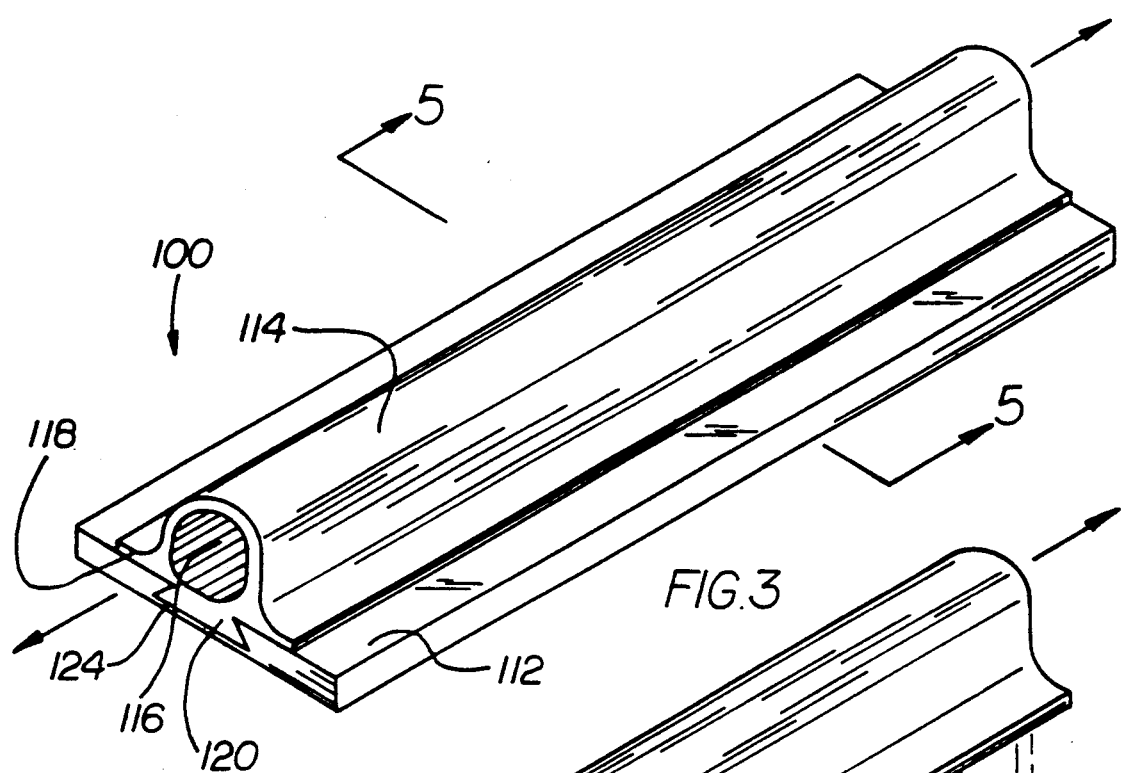
FIG. 3 is a perspective view of a second embodiment of a support ferrule according to the present invention.

Referring now to FIG. 3, there is shown a perspective view of a second embodiment of a support ferrule 100 of the present invention. Unlike the support ferrule of the first embodiment, the support ferrule 100 is partially detachable from the host structure.

A base member 112, having a rectangular configuration, is mounted to a host structure (not shown). Typically, the base member 112 is manufactured of a metal similar to that used in the support ferrule of FIG. 1.

A dovetail slot 124 formed in the base member 112 is designed to conform to the shape of a corresponding dovetail flaring tenon 120 formed on a support member 114.

The support member 114 is disposed along the longitudinal axis of the base member 112 and has a substantially cylindrical configuration. By means of the dovetail slot 124 and the flaring tenon 120, the support member 114 is detachably mounted to the upper surface of the base member 112.

Extending from the cylindrical support member 114 are extension sections 118. When the support member 114 is mounted to the base member 112, the extension sections 118 engage the upper surface of the base member 112 and maintain the position of the support member 114 on the base member 112.

An aperture 116 is formed in the support member 114. Wiring or piping parts are installed and removed via the aperture 116.

A dovetail flaring tenon 120 is formed on the support member 114. Preferably, the flaring tenon 120 extends downwardly from the lower surface of the support member 114. The flaring tenon 120 is designed to be inserted into the corresponding dovetail slot 124 of the base member 112.

Figure 4:
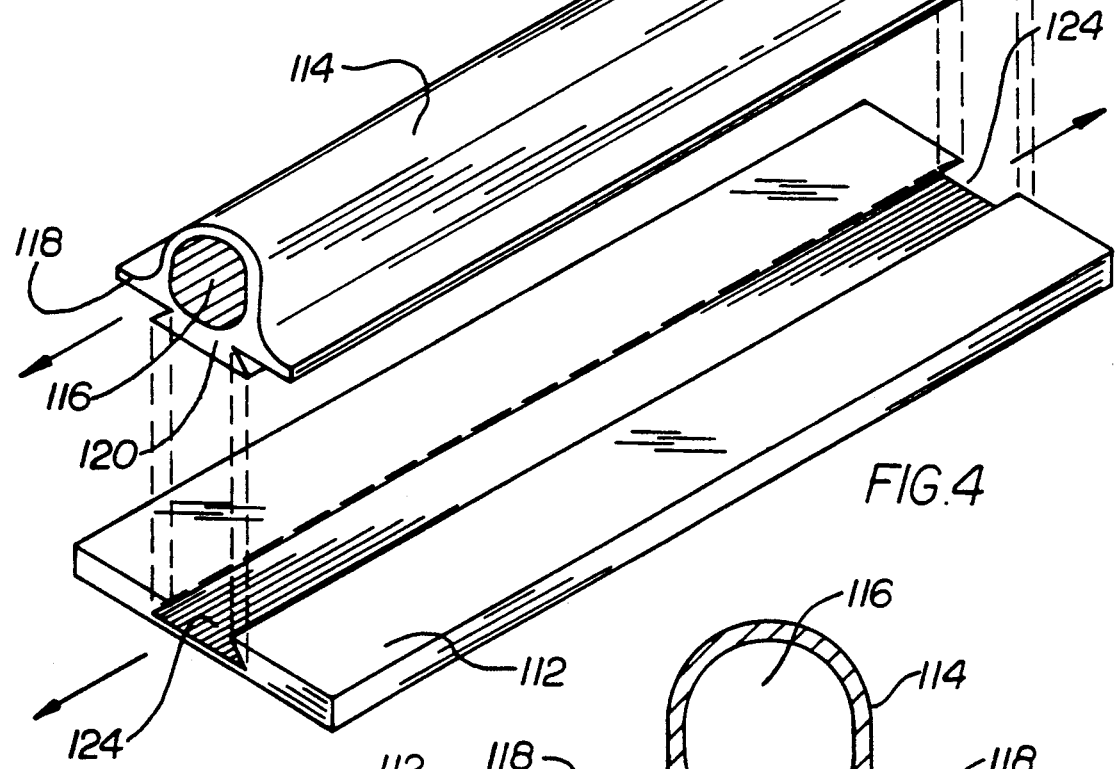
FIG. 4 is an exploded perspective view of the support ferrule illustrated in FIG. 3.
Figure 5:
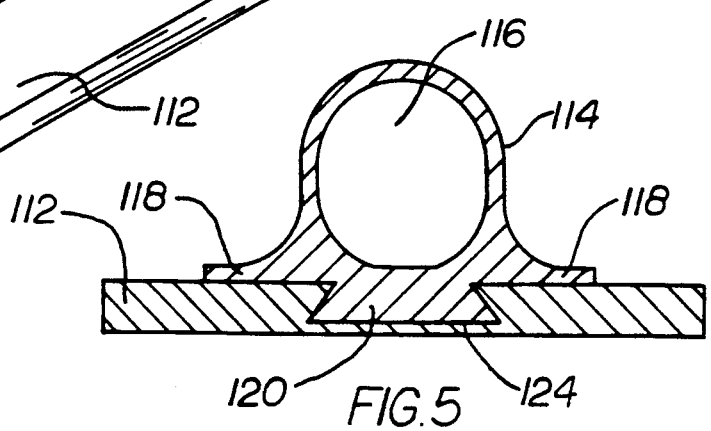
FIG. 5 is a cross-sectional view along line 5—5 of the support ferrule illustrated in FIG. 3.

Referring now to FIGS. 4 and 5, there are shown exploded and section views of the support ferrule illustrated in FIG. 3. The support member 114 includes an aperture 116 and extension sections 118.

To assemble the support ferrule, the flaring tenon 120 is inserted into the dovetail slot 124, and the extension sections 118 of the support member 114 engage the upper surface of the base member 112, thereby detachably mounting the support member 114 to the base member 112.

Figure 6:
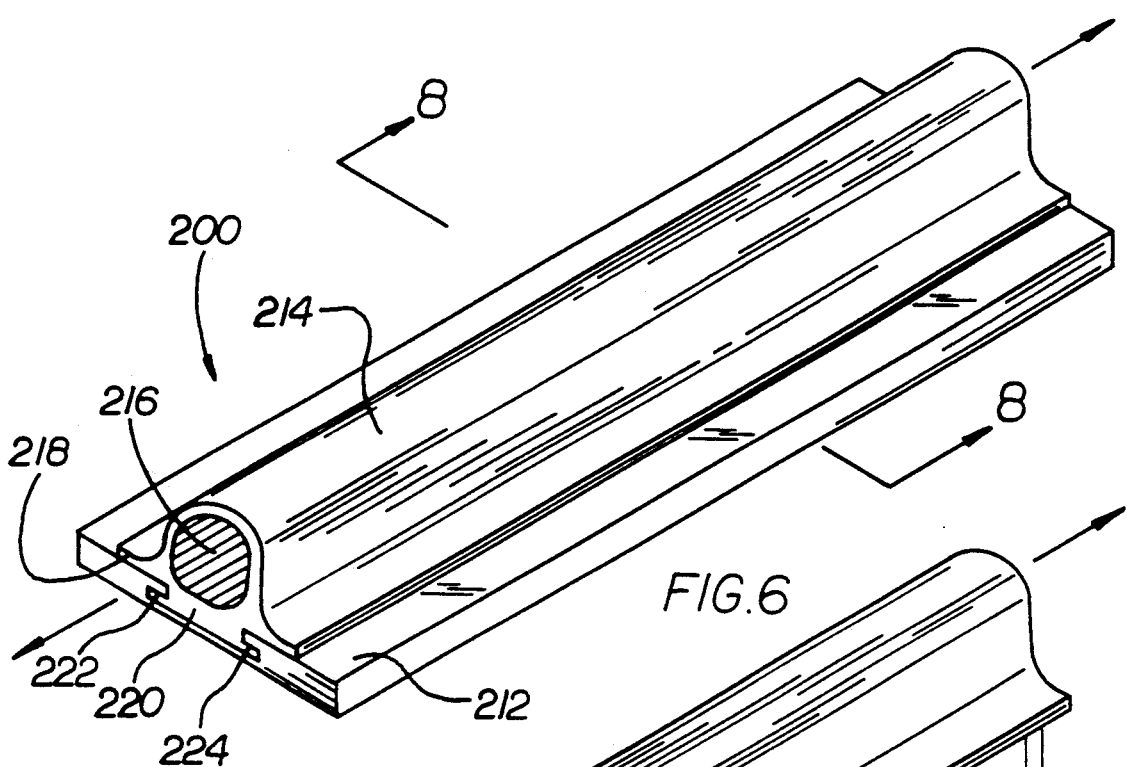
FIG. 6 is a perspective view of a third embodiment of a support ferrule according to the present invention.
Figure 7:
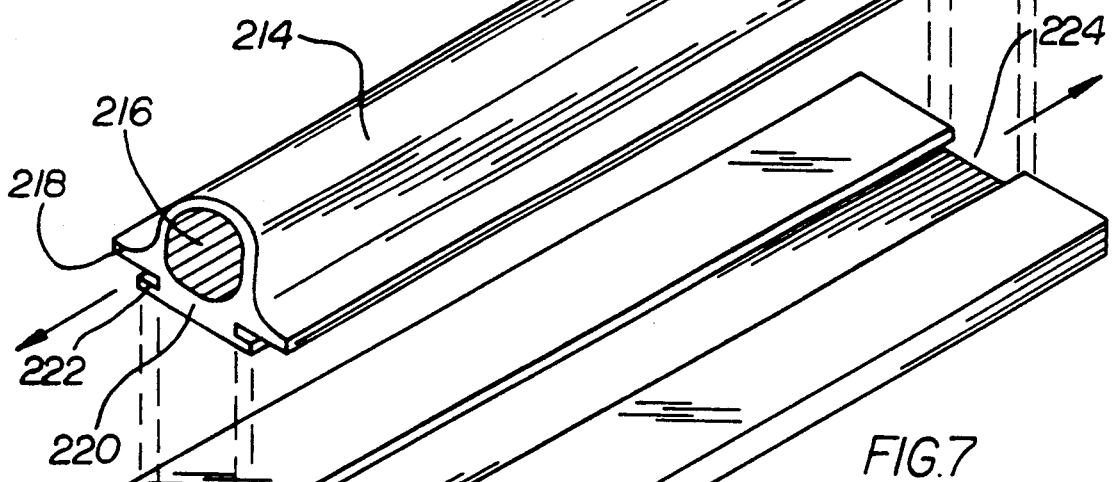
FIG. 7 is an exploded perspective view of the support ferrule illustrated in FIG. 6.
Figure 8:
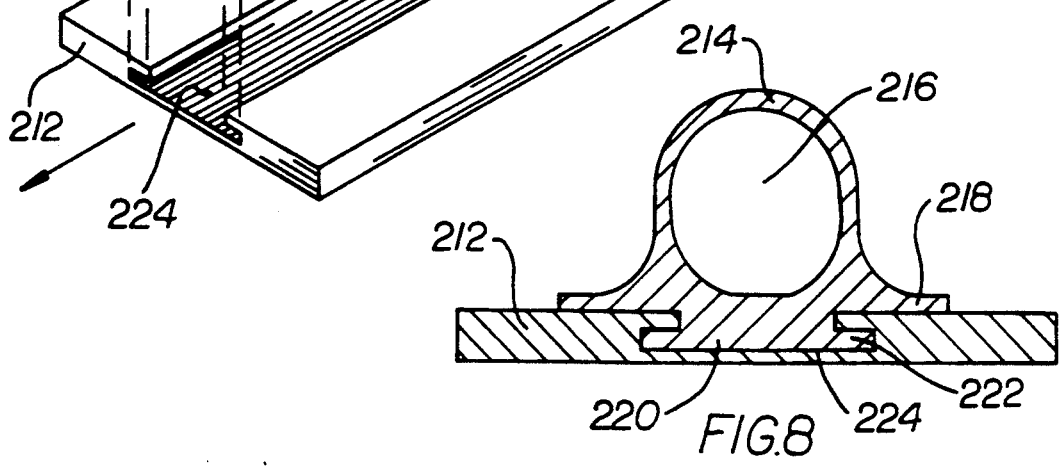
FIG. 8 is a cross-sectional view along line 8—8 of the support ferrule illustrated in FIG. 6.

Referring to FIGS. 6, 7 and 8, there are shown perspective, exploded and section views of a third embodiment of a support ferrule 200 according to the present invention. Like the second embodiment, the support ferrule 200 may be disassembled.

A base member 212, having a substantially rectangular configuration, is mounted to a host structure (not shown). Typically, the base member 212 is manufactured of a metal similar to that described in reference to the first and second embodiments.

A T-shaped slot 224 formed in the base member 212 is designed to conform to the shape of a corresponding T-shaped protuberance 220 formed on a support member 214. The T-shaped protuberance 220 is designed to mate with the T-shaped slot 224.

The support member 214 has a substantially cylindrical cross-section and is disposed along the longitudinal axis of the base member 212. Preferably, the support member 214 is mounted to the upper surface of the base member 212.

Extension sections 218 extend outwardly from the support member 214 and engage the base member 212 when the support member 214 is mounted to the base member.

An aperture 216 is formed in the support member 214. Wiring or piping parts are installed and removed via the aperture 216.

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

I claim:

1. A ferrule for supporting a wiring harness or piping part on a host structure, comprising:
    a base member for mounting to the host structure, the base member including a dovetail-shaped slot; and
    a support member for detachably mounting to the base member, the support member including:
        a cylindrical member extending along the longitudinal axis of the base member;
        an aperture formed in the cylindrical member for receiving the wiring harness or piping part;
        extension sections extending outwardly from the sides of the cylindrical member; and
        a dovetail-shaped protuberance extending downwardly from the cylindrical member, the protuberance for inserting into the dovetail-shaped slot in the base member.

2. A ferrule for supporting a wiring harness or piping part on a host structure, comprising:
    a base member for mounting to the host structure, the base member including an inverted T-shaped slot; and
    a support member for detachably mounting to the base member, the support member including:
        a cylindrical member formed along the longitudinal axis of the base member;
        an aperture extending longitudinally through the cylindrical member for receiving the wiring harness or piping part;
        extension sections extending outwardly from the the cylindrical member; and
        an inverted T-shaped protuberance extending from the cylindrical member, the protuberance for inserting into the T-shaped slot in the base member.

3. A ferrule for supporting a wiring harness or piping part on a host structure, comprising:
    a base member for mounting to the host structure including a dovetail-shaped slot for detachably mounting the support member to the base member; and
    a support member extending from said base member along the longitudinal axis of the base member, the support member including a dovetail-shaped protrusion for insertion into the dovetail-shaped slot in the base member, extension sections extending outwardly from the support member for maintaining the position of the support member of the base member and an aperture for receiving the wiring harness or piping part.

4. A ferrule for supporting a wiring harness or piping part on a host structure, comprising:
    a unitary one piece structure including a substantially rectangular base member and a support member;
        said base member comprising a pair of parallel elongate sides, a pair of transverse ends, and a pair of parallel support legs extending outwardly from a central longitudinal axis of said base member; and
        a support member integrally formed with said base member, said support member being inset from said parallel support legs, said support member defining an enclosed tubular aperture extending continuously along the length of the base member substantially parallel to said longitudinal axis, said tubular aperture terminating at each of said transverse ends.

* * * * *